United States Patent [19]

Kung

[11] Patent Number: 5,241,594

[45] Date of Patent: Aug. 31, 1993

[54] ONE-TIME LOGON MEANS AND METHODS FOR DISTRIBUTED COMPUTING SYSTEMS

[75] Inventor: Kenneth C. Kung, Cerritos, Calif.

[73] Assignee: Hughes Aircraft Company, Los Angeles, Calif.

[21] Appl. No.: 892,088

[22] Filed: Jun. 2, 1992

[51] Int. Cl.$^5$ .............................................. H04L 9/00
[52] U.S. Cl. ........................................... 380/4; 380/3; 380/25
[58] Field of Search ................................. 380/3, 4, 25

[56] References Cited

U.S. PATENT DOCUMENTS

| | | | |
|---|---|---|---|
| 4,800,590 | 1/1989 | Vaughan | 380/25 |
| 4,995,112 | 2/1991 | Aoyama | 380/25 |
| 5,048,085 | 9/1991 | Abraham et al. | 380/25 |

*Primary Examiner*—David C. Cain
*Attorney, Agent, or Firm*—Wanda K. Denson-Low

[57] ABSTRACT

Apparatus and methods of authenticating users in a distributed networked computing system. The system may comprise a central server embodiment that includes a file wherein IDs and encrypted passwords are stored, or a distributed system embodiment where IDs and encrypted passwords are stored in files at each respective computer in the system. A multiple logon procedure and secure transport layer protocol are used with a user's communication software and network communication software. When a user desires to use a particular computer, logon requests are processed by the multiple logon procedure and it accesses the stored file that contains the user's ID and encrypted password, decrypts the password, accesses the remote computer, and logs the user onto that computer. In the central server system all IDs and encrypted passwords are stored on a single computer (the server) that controls access to the entire distributed system. Once access is granted to a particular user, nonencrypted passwords are transmitted to the remote computers, since the server controls the entire system. In the distributed version, password files are stored in all networked computers, and once a user logs on to a computer, if the user wishes to use services at a second computer, the authentication information is forwarded to the second computer using the secure transport layer protocol to protect its integrity, and after receiving the authentication information, it is compared with authentication information for the same user stored in the second computer. If the authentication information matches, the user is logged onto the second computer.

7 Claims, 4 Drawing Sheets

# ONE-TIME LOGON MEANS AND METHODS FOR DISTRIBUTED COMPUTING SYSTEMS

BACKGROUND

The present invention relates generally to distributed computer systems, and more particularly, to a logon system and method for use with distributed and networked computer systems.

The prior art relating to controlling user access in a distributed processing environment is to request users to separately log on to each computer that provides needed services. This practice has many drawbacks. The user must remember many passwords, if passwords are different on each computer. Passwords transmitted in the clear (without security) may easily picked up by others. Repeated logon requests are inconvenient to the user. The use of a bypass scheme by the user to speed up the process could also increase the security risk to the system.

More specifically, in a distributed processing environment, a user must repeatedly provide user identification (ID) codes and passwords to gain access to various services located throughout the system. For instance, a user must log on to a workstation, then log on to new computers when new services are needed. The repetition of these logon sequences is very inconvenient for users. Moreover, if user passwords are not the same on all computers in the system, users must remember many different passwords. To reduce the possibility of using a wrong password, the user might write them down (perhaps posted somewhere close to the workstation). This is not a secure practice. In addition, a user who is in a hurry to obtain information from a particular resource may not wish to go through the repeated logon process. He or she may find ways to bypass the security procedures used in the system, which creates a system weakness. Another weakness is that, to logon remotely, the user ID code and password must be transmitted to the remote computer. Without a secure path from the user's workstation to the remote computer, anyone having access to the system could use a network analyzer to discover the password of the user.

Legion Technologies Corporation has a logon product known a TPX. The TPX product is a IBM mainframe product for a processing environment known as MVS/VM. It provides automated logon to MVS sessions, after an initial authentication to the end system. The user contacts the host computer and is authenticated. The host computer contains an access list of users and services, and grants access based on this list. Only the host computer needs to be modified and failures are localized to one host computer. However, this implementation is a homogeneous solution, with very limited communications available between IBM host servers (TELNET 3270). It is also a relatively expensive architecture to implement.

Another approach is known as the Kerberos system. In this system, a Kerberos server is provided and the user and an application on the host computer authenticate themselves to the server. The user software requests an authentication token from the host application, and both the hosts and user authentication tokens are sent to the server. The server responds with a token only readable by the user and host computer. The contents of the token is used to protect the data throughout the duration of the connection. This system provides for authentication at the application level, and provides for key distribution mechanism. However, this system requires a host server application modification. The server makes possible a single point failure mode. Also, a large initial transaction time is required.

It is therefore an objective of the present invention to provide a safe and user-transparent method and means for authenticating users in a distributed computing system that does not require special purpose hardware development.

SUMMARY OF THE INVENTION

In order to provide for the above and other objectives and features, the present invention provides for a system and method of authenticating users in a distributed computing system. The present invention includes a file stored at a predetermined location, such as a file server or workstation, that includes each user ID and encrypted passwords for each computer of the system. The user passwords stored in the file are encrypted prior to storage. Any convenient encryption algorithm may be employed, such as by using the well-known NSA standard encryption algorithm.

The present invention includes a multiple logon procedure that comprises a firmware or software routine that is used in the communication protocol of the system between a communication software program on a user's computer and a network communication software program on each of the other computers in the system. The present invention employs a secure transport layer protocol that permits secure file transfer between computers of the distributed system. Thus when a user desires to use a particular computer, such as a remote database, for example, a request initiated by the user is processed by the multiple logon procedure which accesses the stored file that contains the user ID codes and encrypted passwords, accesses the remote computer, and then enters the user's ID code and password for that computer. This is done automatically, and the process is transparent to the user and other users of the system. In essence, the remote computer interacts with the multiple logon procedure and its user ID code and password file, the multiple logon procedure decrypts the encrypted password for the particular requested computer and logs the user onto that computer using the ID code and decrypted password.

The present invention thus requires each user to log onto the distributed computing system only a single time and allows the user to access all available computers connected to the network. Several versions of the present invention are provided and include a system having a central server on which the IDs and encrypted passwords are stored, and a distributed system where IDs and encrypted passwords are stored at each respective computer in the system.

In operation, upon completing a single logon procedure at the user's workstation, the user is not required to provide his ID code or password again when services are needed from another computer within the same distributed system. A unique feature of the central server system of the present invention are that all IDs and encrypted passwords are stored on a single computer which controls access to the entire distributed and networked system. Once access is granted to a particular user, nonencrypted passwords are transmitted to the remote computers, since the server provides for control of the entire networked system. Unique features of the distributed system of the present invention are that (1)

the same password files are stored in all networked computers in the system, (2) once a user logs onto one computer, if the user wishes to use services at a second computer in the system, the authentication information is forwarded to the second computer by using a secure transport layer protocol for protecting its integrity, and (3) after it is received, the authentication information is compared with authentication information for the same user stored in the second computer. If the authentication information matches, the user is automatically logged onto the second computer.

With the one-time logon system and method of the present invention, a user only needs to logon to a single workstation. Afterward, authentication information is forwarded by the secure communication protocol to other networked computers where their secure protocols automatically log the user onto those computers. The authentication information transmitted in the network is protected by the secure protocol and communication path to prevent others from recording the authentication information for later logon attempts, to prevent others from impersonating another user, and to guarantee the integrity of the authentication information.

The present invention is useful with any networked systems where a user has access to resources located on remotely located computers. To protect these resources from unauthorized access, user must authenticate himself before access attempts are permitted. Because the authentication system and method of the present invention requires the use of end-system to end-system protection, a secure transport layer protocol may be employed.

The present invention is very robust and may be easily configured to work with mainframes and workstations by simply registering a user at the multiple logon server. The present invention thus provides a safe and user-transparent method to authenticate users in a distributed computing environment.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
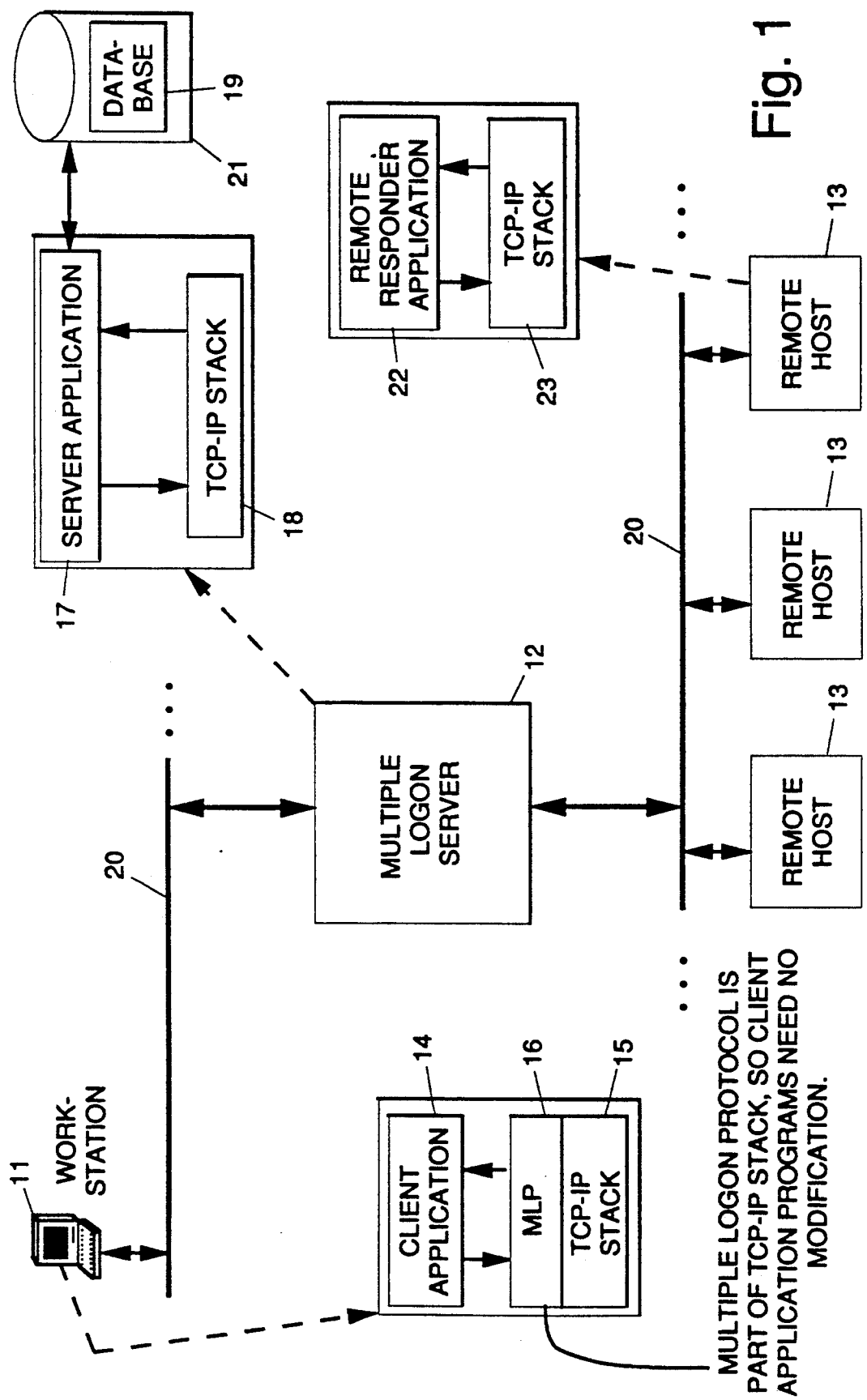
FIG. 1 illustrates a portion of a distributed computer system that employs a one-time logon system and method in accordance with the principles of the present invention that is embodied in a central multiple logon server.

Referring to the drawing figures, FIG. 1 illustrates a portion of a distributed computer system 10 that employs the multiple logon aspects of the present invention that is embodied in a central multiple logon server 12. The distributed computer system 10 includes a user workstation 11, such as a personal computer, for example, the multiple logon server 12, and a remote host computer 13. The user workstation 11, multiple logon server 12, and remote host computer 13 are interconnected by way of a network 20.

The user workstation 11 includes various software and firmware programs, and in particular has a user application program 14, such as a terminal emulator program that is routinely used by the user. As part of the software running on the user workstation 11, a communication protocol such as TCP-IP stack 15 is used to connect each of the processing nodes (workstations 11 and host computers 13) together. In accordance with the principles of the present invention, a multiple logon protocol 16 (software interrupt routine) is "inserted" between the user application program 14 and the TCP-IP stack 15. The multiple logon protocol 16 forms part of the TCP-IP stack 15. As a consequence, the user application program 14 does not have to be modified. A server application program 17 and server TCP-IP stack 18 are provided as part of the multiple logon server 12. The server application program 17 is employed as an interface to a database 19, for example, stored on a disk drive 21 attached to the server 12. The database 19 stores the ID codes and encrypted passwords. The remote host computer 13 also includes a remote responder application program 22 and an associated host TCP-IP stack 23, that permits the user workstation 11 to interface with the remote host computer 13.

Figure 2:
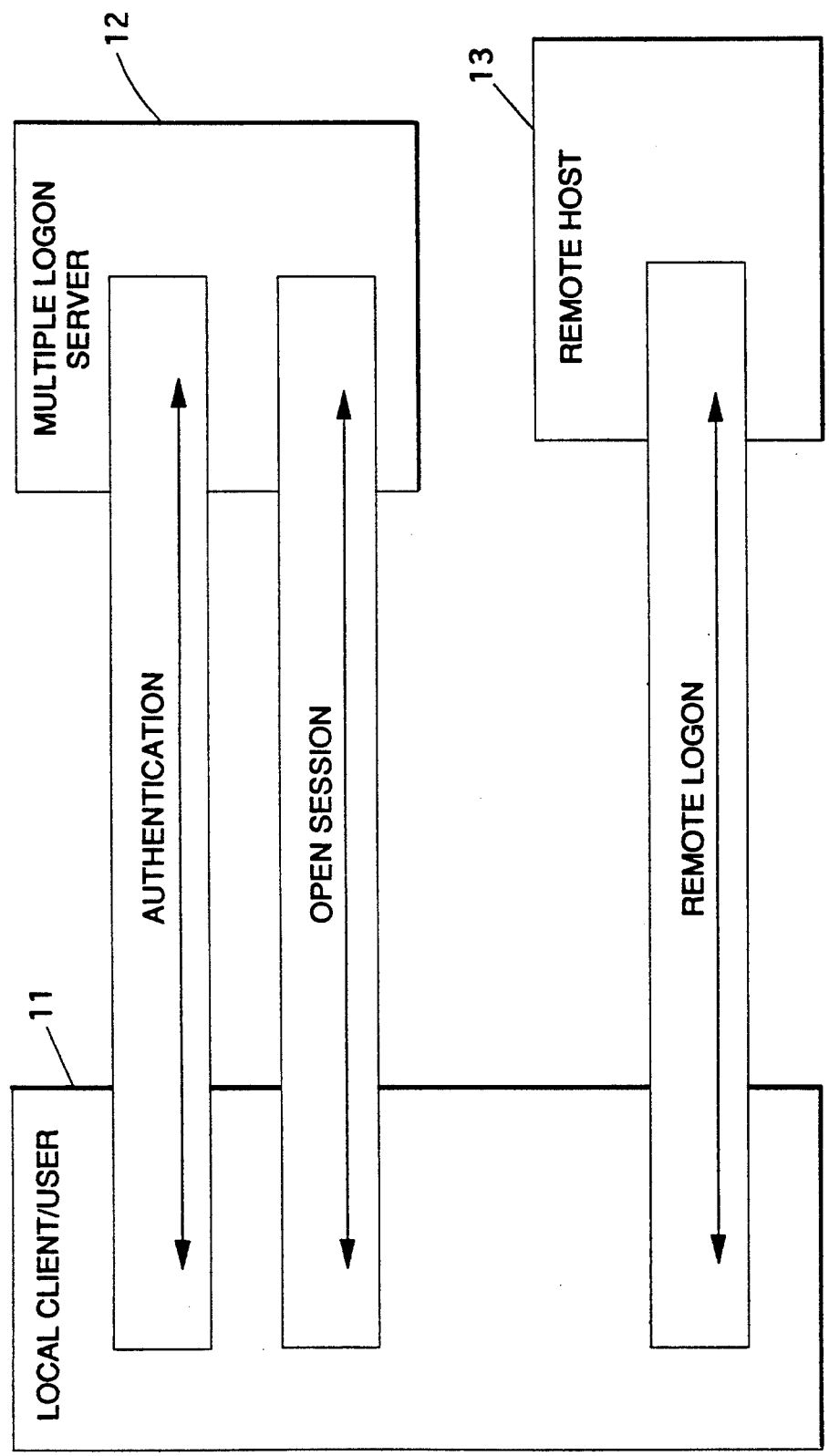
FIG. 2 shows an example of a typical user computing session utilizing the computer system of FIG. 1 employing the system and method of the present invention.

FIG. 2 shows an example of a typical user computing session utilizing the computer system 10 of FIG. 1 employing the present invention. A local user operates the workstation 11 and enters the appropriate user ID and password 30. Communication between the workstation 11 and a multiple logon server 12 is established and authentication of the user ID and password is attempted and if correct, authentication is achieved. This permits an open session to occur wherein the user may use software programs and services provided by the multiple logon server 13. At a later time, if the user desires to log onto a remote host 13, the user ID and password stored on the server 12 are employed to log onto the remote host 13. This is done automatically by means of the communication software located on the workstation 11, the server 12, and the remote host computer 13. Accordingly, access to the remote host computer 13 is obtain without the additional requirement of inputting a user ID and password of the remote host computer 13.

Figure 3:
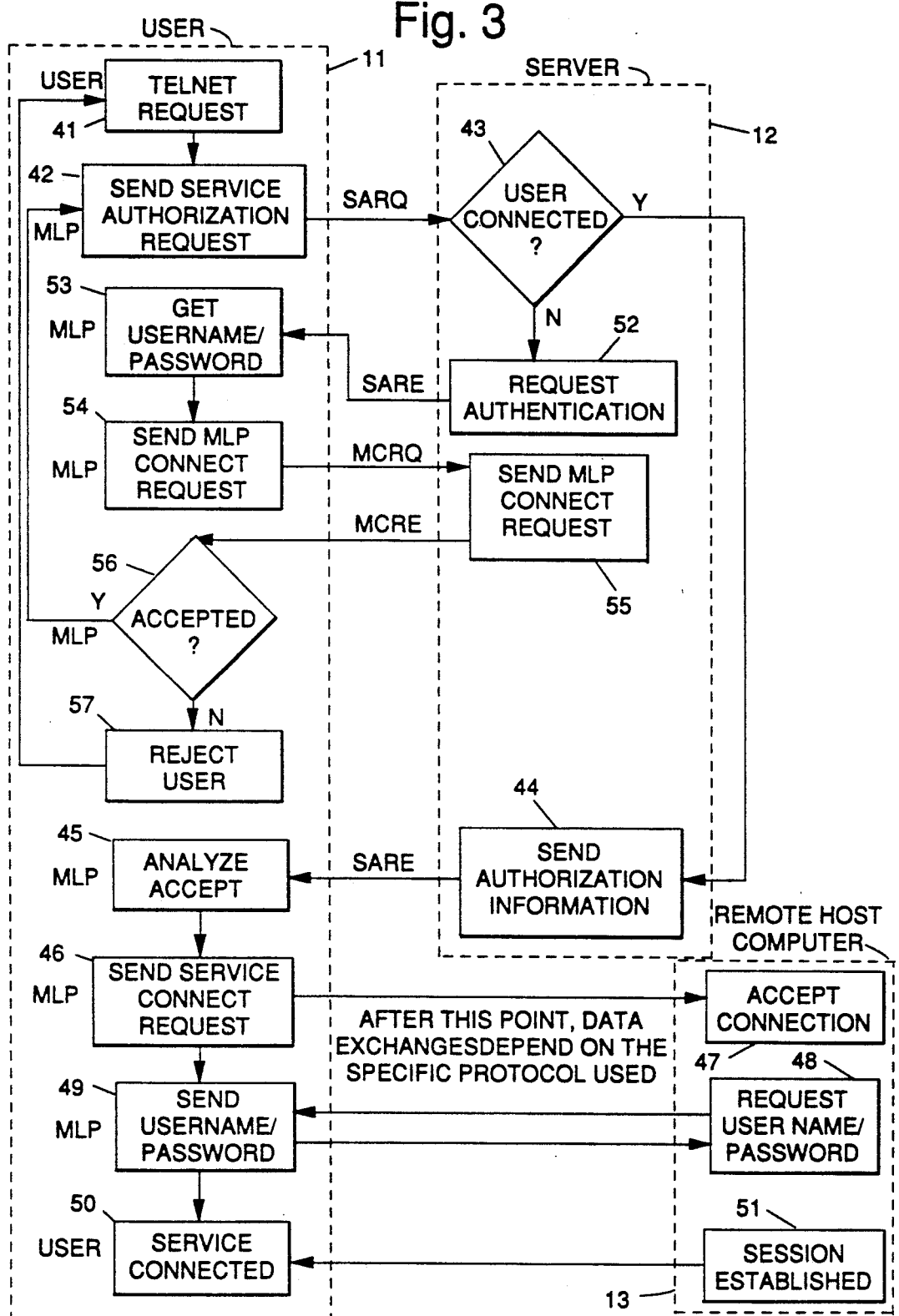
FIG. 3 shows a flow chart of a processing method in accordance with the principles of the present invention.

FIG. 3 shows a detailed flow chart of a processing method 40 in accordance with the principles of the present invention that is implementable in the workstation 11, the server 12, and the host computer 13 of the computer system 10 of FIG. 1. The relevant portions of the processing method 40 that are used in each of these computers are identified within an appropriate dashed box (11, 12, 13). The appropriate action of the user (USERP) or the multiple logon procedure (MLP) of the present invention are identified. Other indentifiers are indicated and will be described below.

At the workstation 11, the user initiates a request 41, such as a TELNET request, for example, for services provided by the remote host computer 13. A service authorization request 42 (SARQ) is generated and transmitted to the server 12 using the communication software package running on the workstation 11 and the server 12. A decision is made in the server 12 (in decision box 43) whether the user is connected to the multiple logon server 12. If the user is connected, then authorization information comprising an authorization message is sent 44 back to the multiple logon procedure in the workstation 11 which analyzes 45 the transmitted message, and sends a service connect request 46 to the remote host computer 13. The remote host computer 13 then accepts the request 47 and connects the user workstation 11 to it. Once connection is made, data exchanged between the workstation 11 and remote host computer 13 are a function of the specific transmission protocol used by the software applications running on each computer. Then the remote host computer 13 requests entry of a user ID and password 48 from the workstation 11. The multiple logon procedure then sends the appropriate user ID and password 49 to the host computer 13. Once service is connected 50, a host computer session is established 51, and the host remote computer 13 is able to provide the requested services to the workstation 11.

If at decision box 43 it is determined that the user workstation 11 is not yet connected to the multiple logon server 12, then an authorization request 52 (SARE) is made to the workstation 11. The authorization request 52 is processed by the multiple logon procedure 16 which retrieves 53 the appropriate user ID and password from the database 19 and sends 54 a connect request (MCRQ) to the server 12. The server 12 in turn sends 55 the connect request (MCRE) to the workstation 11. The connect request (MCRE) is then processed by the multiple logon procedure 16 to determine if the request should be accepted (box 56). If the request is accepted, the multiple logon procedure 16 loops back to the send service authorization request box 42 to wait for a new request. If the request is not accepted, the multiple logon procedure 16 rejects 57 the user and loops to the entry point waiting for the user to initiate an appropriate service request.

Figure 4:
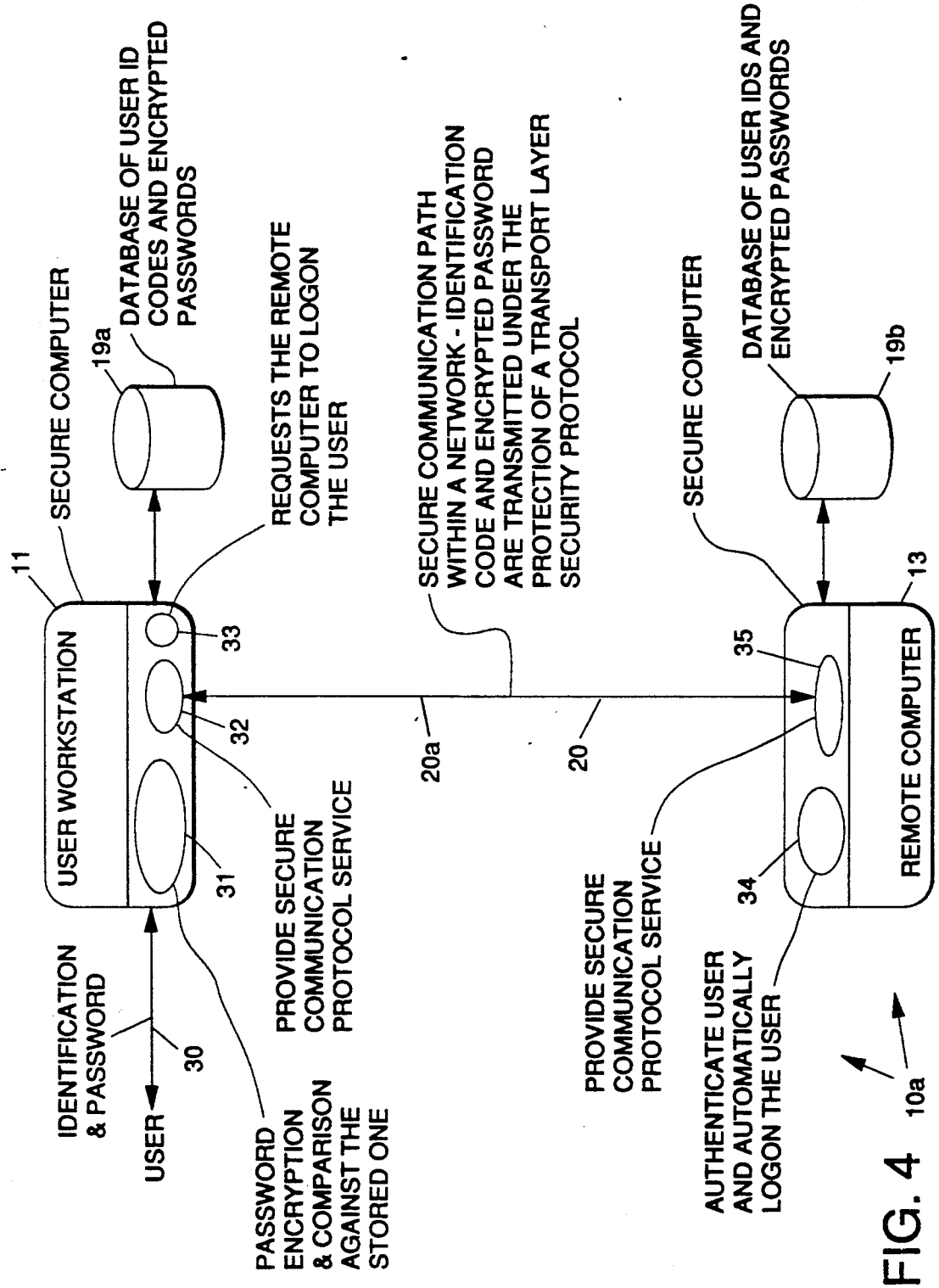
FIG. 4 is illustrates a second embodiment of a distributed computer system that employs the system and method of the present invention.

FIG. 4 is illustrates a second embodiment of a distributed computer system 10a that employs the system and method of the present invention. The system 10a eliminates the multiple logon server 12 of FIG. 1 and incorporates a secure communication path 20a as part of the network 20 that connects a secure user workstation 11 to the remote host computer 13. In operation, at the user workstation 11, a user enters a user identification (ID) code and password 30 in order to log onto the workstation 11. A password encryption routine 31 is employed to encrypt the password 30. The ID code and encrypted password 30 are compared against the ID code and encrypted passwords stored in the workstation 11. The routine 31 employs a database 19a containing the user IDs and encrypted passwords that are used for comparison to the ID and password 30 entered by the user.

Upon entry of the correct ID and password 30, access to the workstation 11 is granted. A secure communication software program 32 is provided that interfaces to the remote host computer 13 over the secure communication path 20a. A similar secure communication software program 35 is provided on the remote host computer 13. A logon routine 33 is provided that requests the remote host computer to log the user onto the remote host computer 13. The logon routine 33 communicates with an authentication routine 34 on the remote host computer 13 that authenticates and logs the user onto the remote host computer 13 upon receipt of the appropriate request. This routine 24 employs a database 19b containing all user IDs and encrypted passwords that are used for comparison to the ID code and password 30 forwarded over the secure communication path 20a.

The present system and method requires that the computers in the distributed processing environment use substantially the same one-way encryption algorithm for encrypting passwords. An individual user is assigned a single password for the entire system 10. The encrypted password for the user is the same on all computers in the system 10. After the user successfully logs onto one computer, such as the workstation 11, the encrypted password is transmitted by a secure transfer protocol 22 to the remote host computer 13 where, if the received ID code and encrypted password matches the ones stored at the remote host computer 13, the user is automatically logged on. The specific sequence of events required to implement the present system and method are as follows.

The user initially logs on to the workstation 11 by providing his identification (ID) code and password. The procedure 31 operating in the workstation 11 encrypts the password and compares it to the encrypted passwords stored in the database 19a. If they are the same, user is logged onto the workstation 11. When the user wishes to access information stored in the remote computer 13, the procedure 33 requests the secure communication procedure 32 to initiate a communication protocol session with the secure communication procedure 35. Both procedure 33 and procedure 32 are located within the workstation 11, which is a secure computer. Hence, only the authorized users can utilize this secure communication path 20a. The secure communication protocol 35 is in the remote computer 13 which is also a secure computer. The secure communication protocol must offer protection from the workstation 11 (secure computer) to the remote computer 13 (secure computer). For example, a transport layer security protocol based on the ISO Draft International Standard well-known to those in the secure communications field may be used for this secure communication service.

After the secure communication path 20a has been established, the procedure 33 transmits the identification (ID) code and encrypted password of the user to the authentication procedure 34 in the remote computer 13. The authentication procedure 34, in the remote computer 11 allows the user to log on from the remote workstation 11. The authentication procedure 34 compares the encrypted password for the user with the one stored in the database 14 coupled to the remote computer 13. If they are the same, the user is permitted to log onto the remote computer 13.

One specific embodiment of the present 10 corresponding to FIG. 1, for example, may include a multiple logon procedure (MLP) server 12, that stores the user ID codes and encrypted passwords and implements the MLP processing routine, that is hosted on a SUN Sparcstation 1+running SUNOS 4.1.1. For this implementation, the MLP server 12 may run as a daemon in a C-shell environment. The host computer 13 (Sparcstation 1+) has an operational TCP/IP protocol installed.

An application interface program library (MLP API) is used that obtains authentication information (user ID codes and passwords) from remote computers other than the MLP server 12. These libraries may be developed and compiled for numerous computers, including a SUN computer running SUNOS 4.1.1, compiled with K&R compilers available on the SUN operating system, as a C library; an IBM/PC computer running a DOS operating system, using a Borland C++3.0 complier, as a DOS library; a NEXT computer running a MACH operating system, compiled with Objective C as an object-oriented interface; and a Macintosh computer running System 7.0, compiled with a Think C Compiler, as a Think C library.

The present invention is most useful in a distributed computing environment where many services are located on separate computers connected by a network. For example, a user may log on to a workstation. When the use of a file server, electronic mail, or directory server is required, the user can access the information without logging onto each of the computers that provide those services.

Thus there has been described a new and improved logon system and method for use with distributed and networked computer systems. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A distributed computing system comprising:
 a user computer comprising a communication program including a multiple logon procedure that is adapted to communicate with a remote computer and that employs a secure transport layer protocol that permits secure file transfer between computers of the distributed computing system, and that comprises a stored file including a user identification code and an encrypted password that permits access to the remote computer from the user computer;
 a remote computer comprising a communication program that is adapted to respond the the communication program on the user computer and that employs the secure transport layer protocol, and that comprises a stored file including a user identification code and an encrypted password that permits access to the remote computer;
 a network interconnecting the user computer and the remote computer;
 and wherein a service request entered from the user computer is processed by the multiple logon procedure which accesses the stored file that contains the user identification code and encrypted password, decrypts the encrypted password of the remote computer, transfers the identification code and decrypted password to the remote computer, and logs the user computer onto the remote computer.

2. The distributed computing system of claim 1 which further comprises:
 a multiple logon server coupled to the network and interposed between the user computer and the remote computer that comprises a multiple logon procedure and communication program that is adapted to communicate with the user computer and the remote computer, and that comprises a stored file including a user identification code and an encrypted password that permits access to the remote computer from the user computer, and that employs the secure transport layer protocol.

3. The distributed computing system of claim 1 wherein the multiple logon procedure performed in the multiple logon server comprises the steps of:
 for each user, encrypting user passwords for each computer in the distributed computing system;
 storing a file on a predetermined computer of the network that comprises each user identification code and encrypted passwords for all computers in the distributed computing system;
 processing service requests for services provided by a selected computer in the system by means of a secure transport layer protocol that permits secure file transfer between computers in the distributed system;
 processing the service requests using a multiple logon procedure;
 accessing the stored file that contains the user identification codes and encrypted passwords;
 accessing the remote computer and entering a user identification code and password for that computer;
 and wherein the remote resource interacts with the multiple logon procedure and user identification code and password file, and the multiple logon procedure decrypts the encrypted password for the particular requested computer and logs the user onto that computer.

4. The distributed computing system of claim 2 wherein the multiple logon procedure performed in the multiple logon server comprises the steps of:
 for each user, encrypting user passwords for each computer in the distributed computing system;
 storing a file on a predetermined computer of the network that comprises each user identification code and encrypted passwords for all computers in the distributed computing system;
 processing service requests for services provided by a selected computer in the system by means of a secure transport layer protocol that permits secure file transfer between computers in the distributed system;
 processing the service requests using a multiple logon procedure;
 accessing the stored file that contains the user identification codes and encrypted passwords;
 accessing the remote resource and enters a user identification code and password for that computer;
 the remote resource interacts with the multiple logon procedure and user identification code and password file, and the multiple logon procedure decrypts the encrypted password for the particular requested computer and logs the user onto that computer.

5. A distributed computing system comprising:
 a user computer a communication program that is adapted to communicate with a remote computer and that comprises a secure transport layer protocol that permits secure file transfer between computers of the distributed computing system;
 a remote computer comprising a communication program that is adapted to respond the the communication program on the user computer and that comprises the secure transport layer protocol;
 a network interconnecting the user computer and the remote computer; and
 a multiple logon server coupled to the network and interposed between the user computer and the remote computer that comprises a multiple logon procedure and communication program that employs the secure transport layer protocol and that is adapted to communicate with the user computer and the remote computer, and that comprises a stored file including a user identification code and an encrypted password that permits access to the remote computer from the user computer;

and wherein a service request entered from the user computer is processed by the multiple logon procedure which accesses the stored file that contains the user identification code and encrypted password, decrypts the encrypted password of the remote computer, transfers the identification code and decrypted password to the remote computer, and logs the user computer onto the remote computer.

6. A method of authenticating users in a distributed computing system comprising a plurality of computers interconnected by way of a network, said method comprising the steps of:

for each user, encrypting user passwords for each computer in the distributed computing system;

storing a file on a predetermined computer of the network that comprises each user identification code and encrypted passwords for all computers in the distributed computing system;

processing service requests for services provided by a selected computer in the system by means of a secure transport layer protocol that permits secure file transfer between computers in the distributed system;

processing the service requests using a multiple logon procedure;

accessing the stored file that contains the user identification codes and encrypted passwords;

accessing the remote resource and enters a user identification code and password for that computer;

the remote resource interacts with the multiple logon procedure and user identification code and password file, and the multiple logon procedure decrypts the encrypted password for the particular requested computer and logs the user onto that computer.

7. A method of authenticating users in a distributed computing system comprising a plurality of workstations and remote computers interconnected by way of a network and a server interposed between the workstations and the remote computers, said method comprising the steps of:

storing a file on the server that comprises each user identification code and encrypted passwords for all computers in the distributed computing system;

providing a predetermined multiple logon procedure that operates on a workstation that is adapted to interface between a workstation and a plurality of remote computers;

using the multiple logon procedure to generate a service request at the workstation for a service available at a remote computer and transmit the service request to the server using a predetermined communication protocol;

determining whether a user is connected to the server, and if the user is connected to the server, transmitting an authorization message to the workstation;

using the multiple logon procedure to send a service connect request from the workstation to the remote computer to connect the workstation to the remote computer;

requesting entry of a user ID and password from the workstation;

using the multiple logon procedure to send an appropriate user ID and password from the workstation to the remote computer to establish connection therebetween;

if the user workstation is not connected to the server, then the server requests authentication from the workstation;

using the multiple logon procedure to process the authorization request and retrieve an appropriate user ID and password from the file and send a connect request to the server;

upon receipt of the proper user ID and password, the server sends a service connect message to the workstation and connection is established therebetween;

if the service request is accepted, the multiple logon procedure waits for a new request;

if the service request is not accepted, the multiple logon procedure rejects the user and waits for the user to initiate an appropriate service authorization request.

* * * * *